United States Patent
Hikida

(10) Patent No.: US 9,247,147 B2
(45) Date of Patent: Jan. 26, 2016

(54) OUTPUT APPARATUS FOR OUTPUTTING A CAPTURED IMAGE BASED ON AN ASPECT RATIO CHANGE, METHOD OF CONTROLLING OUTPUT APPARATUS, AND RECORDING MEDIUM

(71) Applicant: CANON KABUSHIKI KAISHA, Tokyo (JP)

(72) Inventor: Yoshiro Hikida, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/287,893

(22) Filed: May 27, 2014

(65) Prior Publication Data
US 2014/0354871 A1    Dec. 4, 2014

(30) Foreign Application Priority Data
May 29, 2013    (JP) ................................. 2013-113169

(51) Int. Cl.
*H04N 5/232*    (2006.01)
(52) U.S. Cl.
CPC ....... *H04N 5/23296* (2013.01); *H04N 5/23206* (2013.01)

(58) Field of Classification Search
CPC ...................... H04N 5/23203; H04N 5/23216
USPC ....................................................... 348/211.8
See application file for complete search history.

(56) References Cited

U.S. PATENT DOCUMENTS

2007/0188622 A1* 8/2007 Yagi ........................... 348/220.1
2013/0107062 A1* 5/2013 Okazaki ..................... 348/207.1

FOREIGN PATENT DOCUMENTS

JP    07-114461 B2    12/1995
JP    08-251471 A      9/1996

* cited by examiner

*Primary Examiner* — Nelson D. Hernández Hernández
(74) *Attorney, Agent, or Firm* — Rossi, Kimms & McDowell LLP

(57) ABSTRACT

When a captured image having the first aspect ratio is to be output, the first captured image obtained by imaging the first imaging range is output. When a captured image having the second aspect ratio smaller at the ratio of the length in one of the vertical and horizontal directions to the length in the other direction than the first aspect ratio is to be output, the second captured image with an imaging range in the one direction corresponding to the first imaging range is output.

22 Claims, 17 Drawing Sheets

FIG. 4
16:9 SIZE VIDEO
401
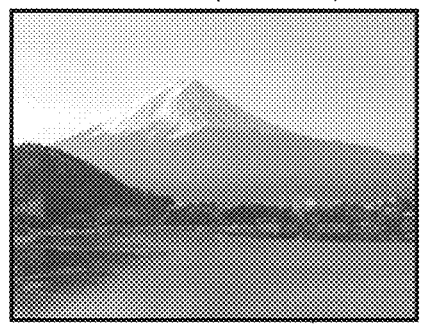
4:3 SIZE VIDEO (CLIPPED)
402
FIG. 5
16:9 SIZE VIDEO
501
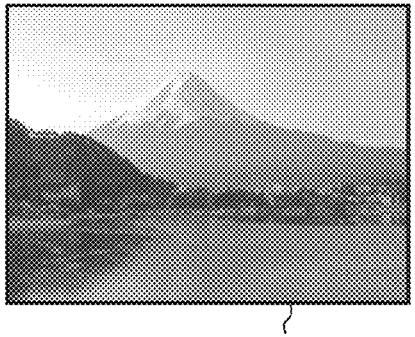
4:3 SIZE VIDEO
(CHANGE IN MAGNIFICATION)
502

F I G. 12
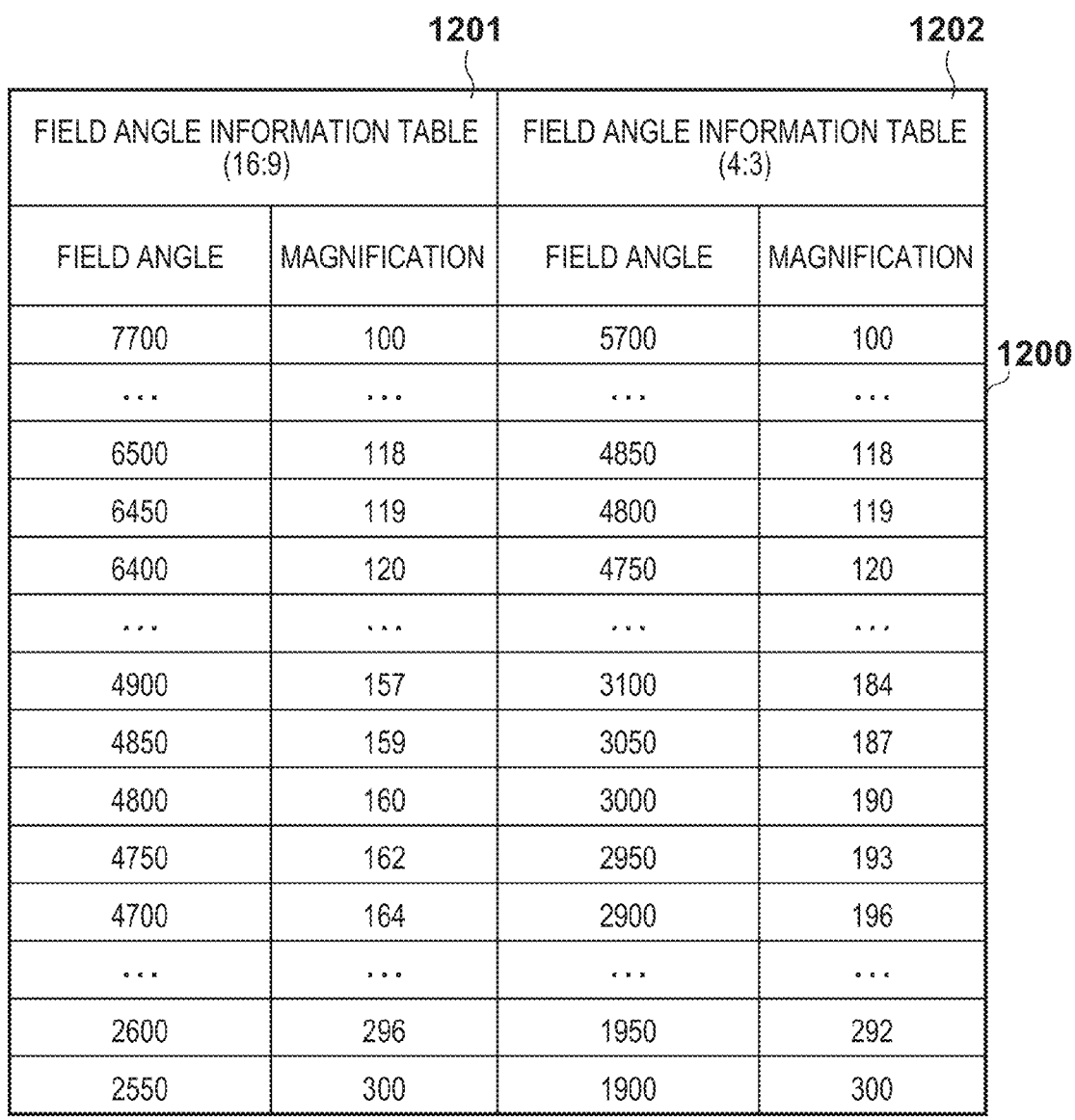

FIG. 18

FIELD ANGLE INFORMATION TABLE 1800

FIELD ANGLE INFORMATION TABLE (16:9) — 1801

| FIELD ANGLE | MAGNIFI-CATION | VIDEO SIZE INFORMATION | |
|---|---|---|---|
| | | Hline | Vline |
| 7700 | 100 | 0 | 0 |
| ... | ... | ... | ... |
| 6500 | 118 | 0 | 0 |
| 6450 | 119 | 0 | 0 |
| 6400 | 120 | 0 | 0 |
| ... | ... | ... | ... |
| 4900 | 157 | 0 | 0 |
| 4850 | 159 | 0 | 0 |
| 4800 | 160 | 0 | 0 |
| 4750 | 162 | 0 | 0 |
| 4700 | 164 | 0 | 0 |
| ... | ... | ... | ... |
| 2600 | 296 | 0 | 0 |
| 2550 | 300 | 0 | 0 |
| ... | ... | ... | ... |
| 2000 | 300 | 1500 | 117 |
| 1950 | 300 | 1470 | 127 |
| 1900 | 300 | 1440 | 135 |

FIELD ANGLE INFORMATION TABLE (4:3) — 1803

| FIELD ANGLE | MAGNIFI-CATION | VIDEO SIZE INFORMATION | |
|---|---|---|---|
| | | Hline | Vline |
| 7700 | 100 | 1920 | 180 |
| ... | ... | ... | ... |
| 6500 | 100 | 1630 | 72 |
| 6450 | 100 | 1610 | 64 |
| 6400 | 100 | 1600 | 60 |
| ... | ... | ... | ... |
| 4900 | 116 | 0 | 0 |
| 4850 | 118 | 0 | 0 |
| 4800 | 119 | 0 | 0 |
| 4750 | 120 | 0 | 0 |
| 4700 | 121 | 0 | 0 |
| ... | ... | ... | ... |
| 3000 | 190 | 0 | 0 |
| 2550 | 223 | 0 | 0 |
| ... | ... | ... | ... |
| 2000 | 285 | 0 | 0 |
| 1950 | 292 | 0 | 0 |
| 1900 | 300 | 0 | 0 |

OUTPUT APPARATUS FOR OUTPUTTING A CAPTURED IMAGE BASED ON AN ASPECT RATIO CHANGE, METHOD OF CONTROLLING OUTPUT APPARATUS, AND RECORDING MEDIUM

BACKGROUND OF THE INVENTION

1. Field of the Invention

The present invention relates to an apparatus which can transmit videos having different aspect ratios upon switching between them and a method of controlling the apparatus.

2. Description of the Related Art

In general, in preset control for a monitoring camera, when changing a video having the first aspect ratio to a video having the second aspect ratio, aspect ratio switching is performed by a method like that shown in FIG. 4 or 5. The method shown in FIG. 4 changes the aspect ratio by clipping an image in a size of 4:3 from a video 401 captured in a size of 16:9. A video 402 captured in an aspect ratio of 4:3 becomes smaller in field angle than the video 401. In addition, the method shown in FIG. 5 changes the magnification of a video 501 captured in an aspect ratio of 16:9 to a video 502 having an aspect ratio of 4:3. This leads to distortion of the video itself.

Japanese Patent Publication No. 07-114461 discloses an arrangement configured to obtain a desired video by changing the magnification of a video at the time of preset control.

The related art disclosed in Japanese Patent Publication No. 07-114461 cannot sometimes obtain any video in a desired range because of a change in field angle caused by zoom control.

SUMMARY OF THE INVENTION

An embodiment of the present invention provides an output apparatus which outputs an image with an imaging range being maintained in one of the horizontal and vertical directions even with a change in the aspect ratio of an image to be output.

According to one aspect of the present invention, there is provided an output apparatus comprising: a control unit configured to perform control to make an imaging unit obtain a first captured image and control to make the imaging unit obtain a second captured image by setting a field angle of the imaging unit in one of a vertical direction and a horizontal direction to a field angle larger than a field angle at which the first captured image is obtained; and an output unit configured to output the first captured image and output a third captured image, upon clipping the image from the second captured image, which is smaller at a ratio of a length in the one direction to a length in the other direction than the first captured image, with an imaging range in the one direction corresponding to the first captured image.

Also, according to another aspect of the present invention, there is provided an output apparatus which is configured to change a ratio of a length of a captured image to be output in one of a vertical direction and a horizontal direction to a length in the other direction, the apparatus comprising: an acquisition unit configured to acquire first information representing a first imaging range of a captured image to be output when an imaging direction of an imaging unit is a first imaging direction and second information representing a second imaging range of a captured image to be output when an imaging direction of the imaging unit is a second imaging direction; and an output unit configured to output a first captured image obtained by imaging an imaging range, with an imaging range in the one direction corresponding to the first imaging range, when outputting a captured image having a first ratio as the length ratio larger than a second ratio based on a captured image obtained by the imaging unit at a first field angle in the first imaging direction, output a second captured image, with an imaging range in the one direction corresponding to the first imaging range, when outputting a captured image having the second ratio based on a captured image obtained by the imaging unit at a second field angle larger than the first field angle in the first imaging direction, output a third captured image obtained by imaging an imaging range, with an imaging range in the one direction corresponding to the second imaging range, when outputting a captured image having the first ratio based on a captured image obtained by the imaging unit at a third field angle in the second imaging direction, and output a fourth captured image, with an imaging range in the one direction corresponding to the second imaging range, when outputting a captured image having the second ratio based on a captured image obtained by the imaging unit at a fourth field angle larger than the third field angle in the second imaging direction.

Also, according to another aspect of the present invention, there is provided a method of controlling an output apparatus, the method comprising: a first control step of causing an imaging unit to obtain a first captured image; a first output step of outputting the first captured image; a second control step of causing the imaging unit to obtain a second captured image upon setting a field angle of the imaging unit in one of a vertical direction and a horizontal direction to a field angle larger than a field angle at which the first captured image is obtained; and a second output step of outputting a third captured image, upon clipping the image from the second captured image, which is smaller at a ratio of a length in the one direction to a length in the other direction than the first captured image, with an imaging range in the one direction corresponding to the first captured image.

Also, according to another aspect of the present invention, there is provided a method of controlling an output apparatus which is configured to change a ratio of a length of a captured image to be output in one of a vertical direction and a horizontal direction to a length in the other direction, the method comprising: a first acquisition step of acquiring first information representing a first imaging range of a captured image to be output when an imaging direction of an imaging unit is a first imaging direction; a first output step of outputting a first captured image obtained by imaging an imaging range, with an imaging range in the one direction corresponding to the first imaging range, when outputting a captured image having a first ratio as the length ratio larger than a second ratio based on a captured image obtained by the imaging unit at a first field angle in the first imaging direction and outputting a second captured image, with an imaging range in the one direction corresponding to the first imaging range, when outputting a captured image having the second ratio based on a captured image obtained by the imaging unit at a second field angle larger than the first field angle in the first imaging direction; a second acquisition step of acquiring second information representing a second imaging range of a captured image to be output when an imaging direction of the imaging unit is a second imaging direction; and a second output step of outputting a third captured image obtained by imaging an imaging range, with an imaging range in the one direction corresponding to the second imaging range, when outputting a captured image having the first ratio based on a captured image obtained by the imaging unit at a third field angle in the second imaging direction and outputting a fourth captured image, with an imaging range in the one direction corresponding to the second imaging range, when outputting a captured image having the second ratio based on a captured image obtained by the imaging unit at a fourth field angle larger than the third field angle in the second imaging direction.

Also, according to another aspect of the present invention, there is provided a recording medium recording a program for causing a computer to execute a first control procedure for causing an imaging unit to obtain a first captured image, a first output procedure for outputting the first captured image, a second control procedure for causing the imaging unit to obtain a second captured image upon setting a field angle of the imaging unit in one of a vertical direction and a horizontal direction to a field angle larger than a field angle at which the first captured image is obtained, and a second output procedure for outputting a third captured image, upon clipping the image from the second captured image, which is smaller at a ratio of a length in the one direction to a length at the other direction than the first captured image, with an imaging range in the one direction corresponding to the first captured image.

Furthermore, according to another aspect of the present invention, there is provided a recording medium recording a program for causing a computer which is configured to change a ratio of a length of a captured image to be output in one of a vertical direction and a horizontal direction to a length in the other direction to execute a first acquisition procedure for acquiring first information representing a first imaging range of a captured image to be output when an imaging direction of an imaging unit is a first imaging direction, a first output procedure for outputting a first captured image obtained by imaging an imaging range, with an imaging range in the one direction corresponding to the first imaging range, when outputting a captured image having a first ratio as the length ratio larger than a second ratio based on a captured image obtained by the imaging unit at a first field angle in the first imaging direction and outputting a second captured image, with an imaging range in the one direction corresponding to the first imaging range, when outputting a captured image having the second ratio based on a captured image obtained by the imaging unit at a second field angle larger than the first field angle in the first imaging direction, a second acquisition procedure for acquiring second information representing a second imaging range of a captured image to be output when an imaging direction of the imaging unit is a second imaging direction, and a second output procedure for outputting a third captured image obtained by imaging an imaging range, with an imaging range in the one direction corresponding to the second imaging range, when outputting a captured image having the first ratio based on a captured image obtained by the imaging unit at a third field angle in the second imaging direction and outputting a fourth captured image, with an imaging range in the one direction corresponding to the second imaging range, when outputting a captured image having the second ratio based on a captured image obtained by the imaging unit at a fourth field angle larger than the third field angle in the second imaging direction.

Further features of the present invention will become apparent from the following description of exemplary embodiments (with reference to the attached drawings).

BRIEF DESCRIPTION OF THE DRAWINGS

FIG. 4 is a view for explaining preset control by trimming;

FIG. 5 is a view for explaining preset control by a magnification changing operation;

FIG. 12 is a view showing a table in the first embodiment;

FIG. 18 is a view showing a table in the second embodiment.

DESCRIPTION OF THE EMBODIMENTS

Several embodiments of the present invention will be described in detail below with reference to the accompanying drawings.

First Embodiment

Figure 1:
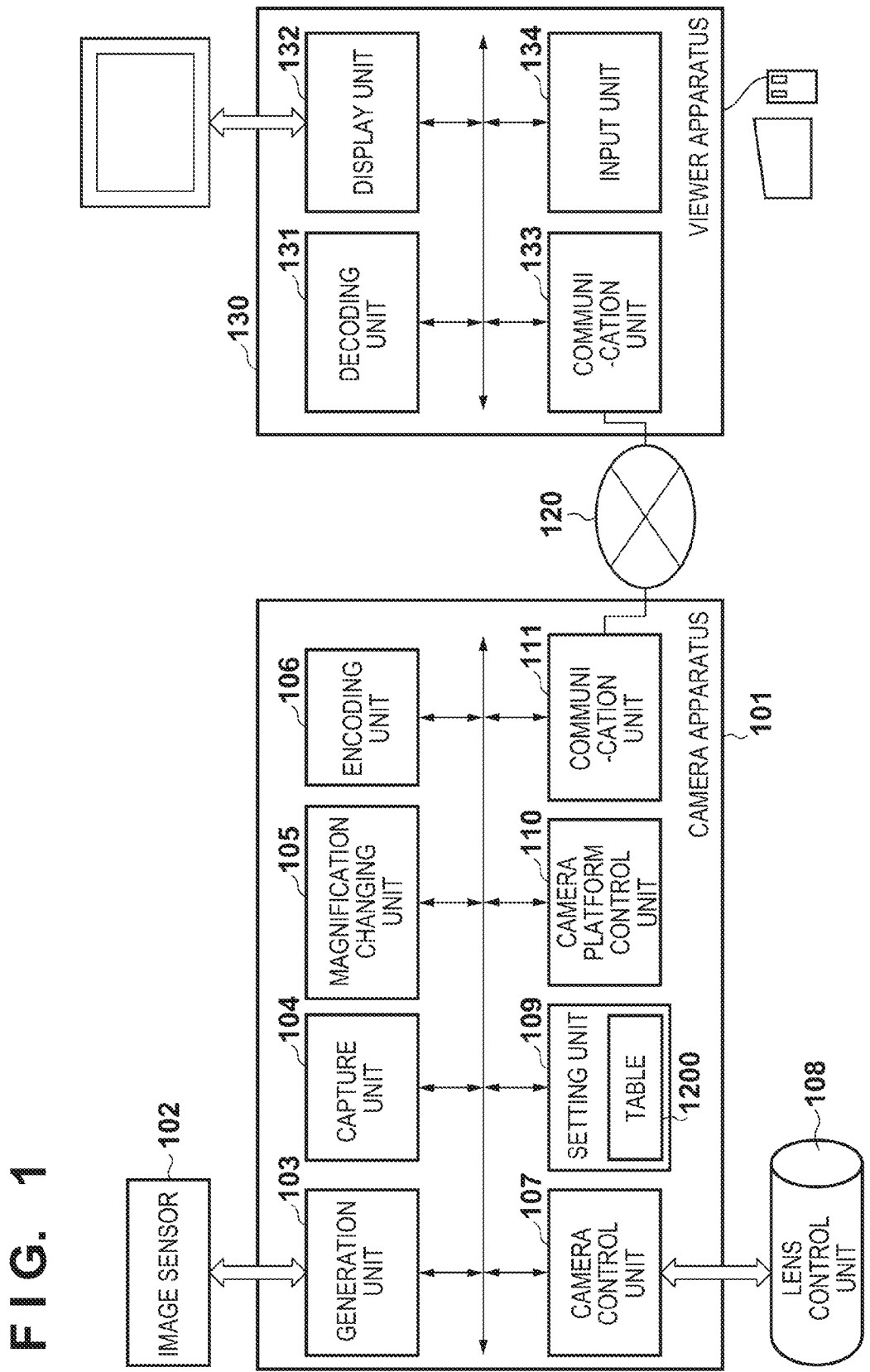
FIG. 1 is a block diagram showing the arrangement of a system in an embodiment.

The following will describe switching from a 16:9 video to a 4:3 video when switching between aspect ratios in the first embodiment with reference to the accompanying drawings. FIG. 1 is a block diagram showing the arrangement of a camera apparatus according to the first embodiment. A camera apparatus 101 in this embodiment is an output apparatus which outputs a captured image.

Figure 9:
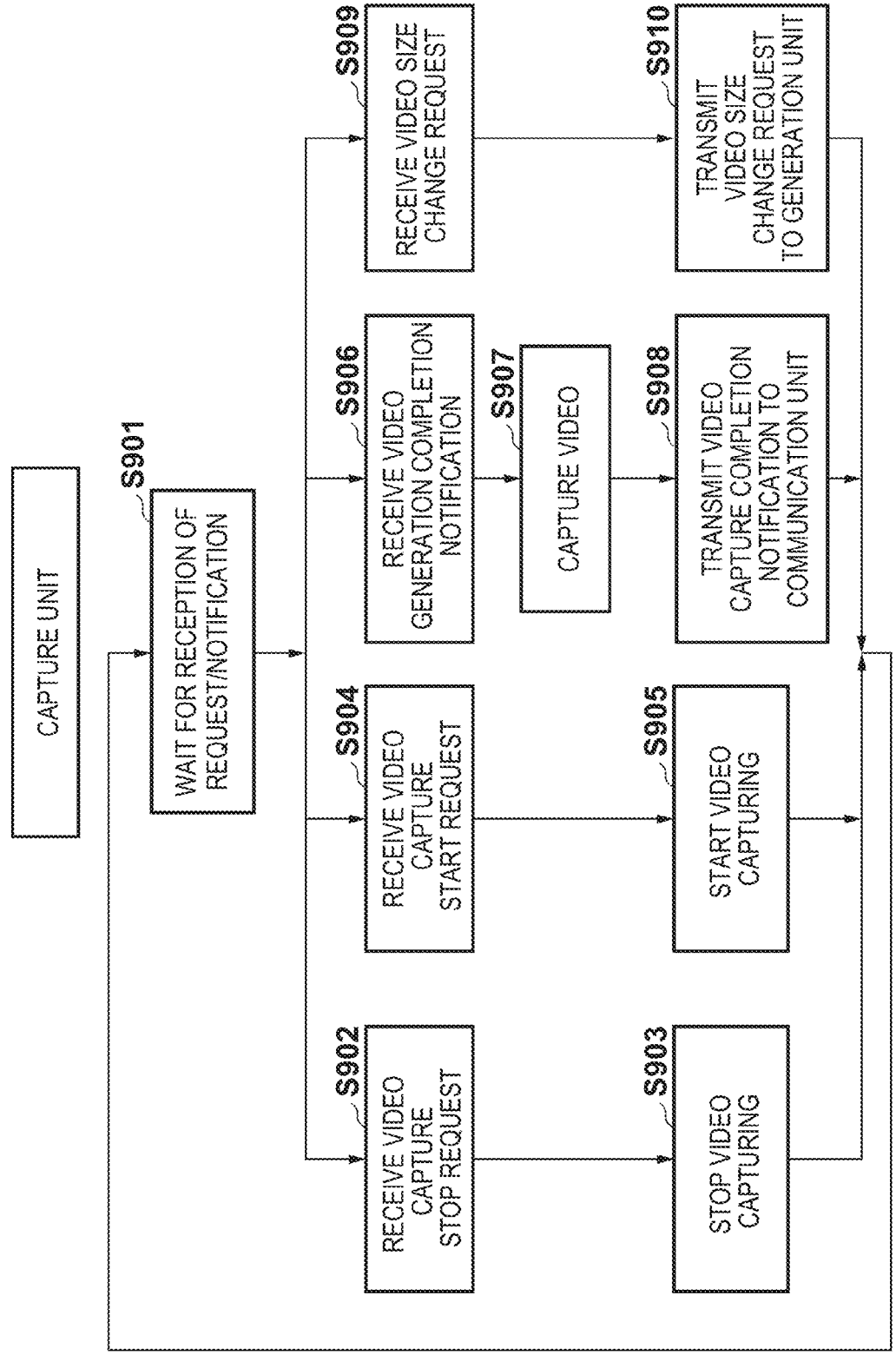
FIG. 9 is a flowchart showing control by a capture unit in the first embodiment.
Figure 10:
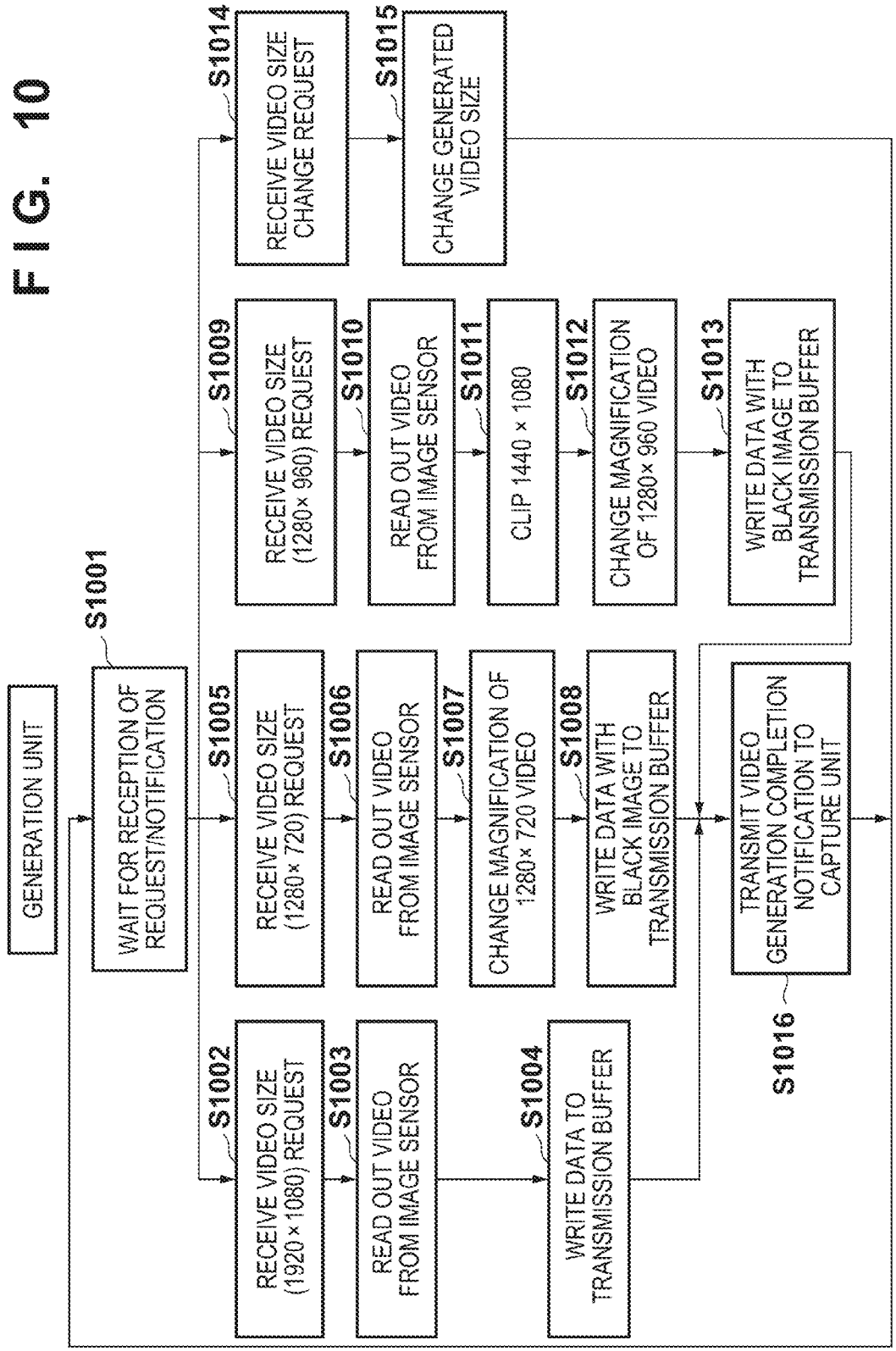
FIG. 10 is a flowchart showing control by a generation unit in the first embodiment.

Referring to FIG. 1, the camera apparatus 101 includes a camera platform and a camera (neither of which is shown), and is connected to a viewer apparatus 130 via a network 120. In the camera apparatus 101, an image sensor 102 is a CCD or the like. A generation unit 103 acquires a video signal from the image sensor 102 and generates video data. Note that a more detailed operation of the generation unit 103 will be described later with reference to the flowchart of FIG. 10. In this embodiment, the image sensor 102 and the generation unit 103 generate video data of 1,920×1,080 pixels. The generation unit 103 also extracts video data having different video sizes from the video data of 1,920×1,080 pixels in accordance with a request. A capture unit 104 captures the video data generated by the generation unit 103. Note that a more detailed operation of the capture unit 104 will be described later with reference to the flowchart of FIG. 9. A magnification changing unit 105 changes the magnification of the video data generated by the generation unit 103. An encoding unit 106 encodes video data transmitted to the viewer apparatus 130.

Figure 8:
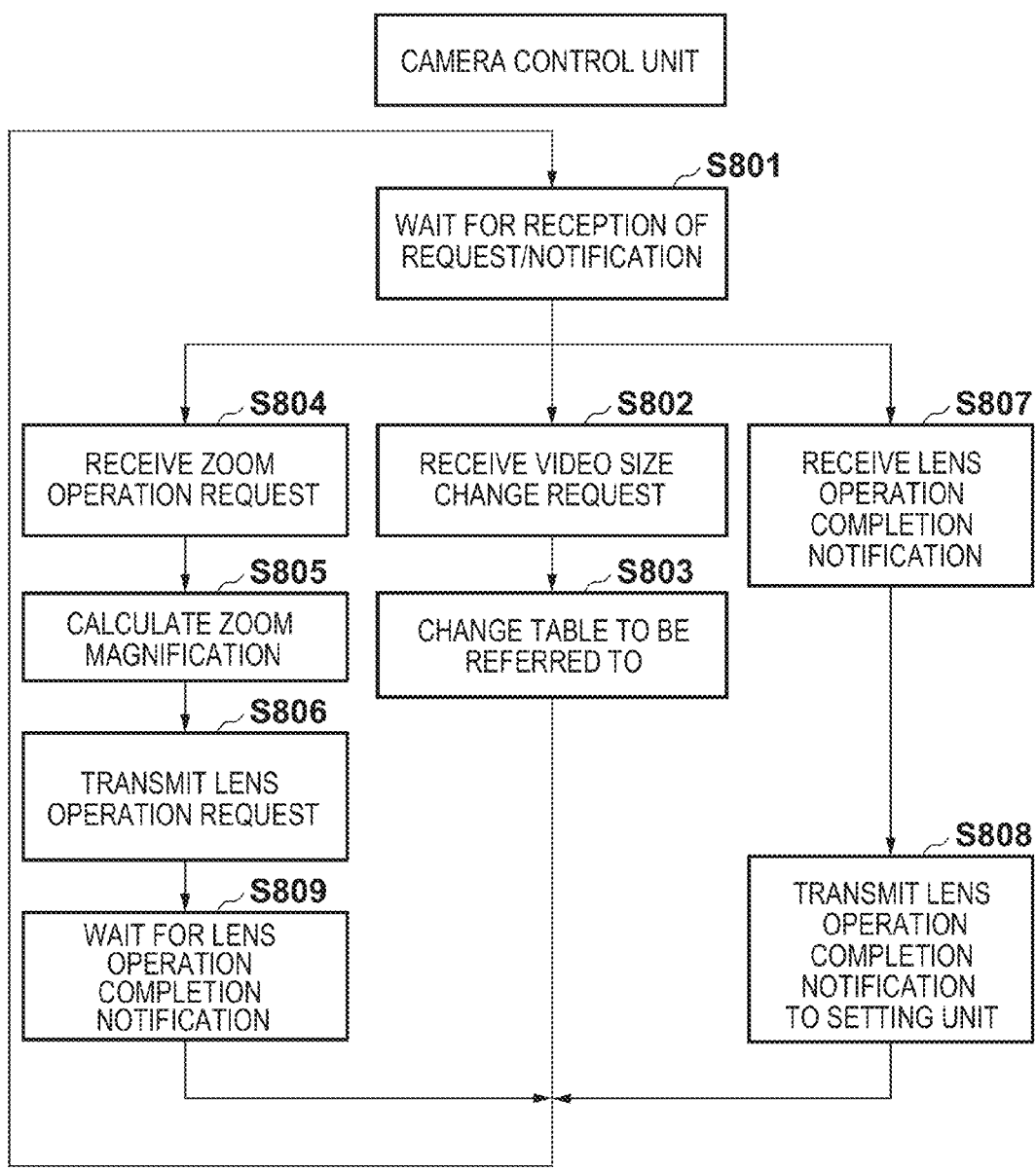
FIG. 8 is a flowchart showing control by a camera control unit in the first embodiment.

A camera control unit 107 has a table 1200 (FIG. 12) to be described later. The camera control unit 107 controls a lens control unit 108 by referring to this table to change, for example, the zoom magnification. The camera control unit 107 controls an imaging unit to obtain the first captured image. In addition, the camera control unit 107 controls the imaging unit to obtain the second captured image upon setting the field angle of the imaging unit in one of the vertical and horizontal directions to a field angle larger than that set when obtaining the first captured image. The imaging unit includes the image sensor 102 described above and lens unit (to be described later) A more detailed operation of the camera control unit 107 will be described later with reference to the flowchart of FIG. 8.

The lens control unit 108 has a zoom mechanism which implements a designated zoom magnification. The lens control unit 108 controls the lens unit for forming an image on the image sensor 102. When the zoom magnification is changed, the lens control unit 108 drives the lens unit to change the field angle at which the imaging unit performs imaging. As the zoom magnification increases, the field angle at which the imaging unit performs imaging decreases. That is, the imaging range in which the imaging unit performs imaging narrows. As the zoom magnification decreases, the field angle at which the imaging unit performs imaging increases. That is, the imaging range in which the imaging unit performs imaging widens. As described above, the zoom magnification at which the imaging unit performs imaging corresponds to the field angle at which the imaging unit performs imaging.

A setting unit 109 issues a processing request to each unit based on a requested video size and preset set information. A more detailed operation of the setting unit 109 will be described later with reference to the flowchart of FIG. 6. A camera platform control unit 110 controls a camera platform, on which the camera incorporating the image sensor 102 and the lens control unit 108 is mounted, to decide the pan and tilt of the camera. A communication unit 111 manages requests and notifications for the respective devices in the viewer apparatus 130 and the camera apparatus 101. Note that a more detailed operation of the communication unit 111 will be described later with reference to the flowchart of FIG. 7.

In the viewer apparatus 130, a decoding unit 131 decodes the video data encoded by the encoding unit 106. A display unit 132 displays the video data decoded by the decoding unit 131 on the display. A communication unit 133 connects the viewer apparatus 130 to the camera apparatus 101 via the network 120. An input unit 134 accepts an input from the user via a keyboard or mouse. The operation of the monitoring camera apparatus according to this embodiment including the above camera apparatus 101 and the above viewer apparatus 130 will be described below.

When transmitting a 16:9 video having 1,920×1,080 pixels, the generation unit 103 sends the video read out from the image sensor 102 as a video having a size of 1,920×1,080 pixels to the capture unit 104. The capture unit 104 captures the video having a size of 1,920×1,080 pixels. The camera control unit 107 controls the lens unit via the lens control unit 108 by using the table 1200 (to be described later with reference to FIG. 12) corresponding to, for example, aspect ratios of 16:9 and 4:3. As will be described later with reference to FIGS. 12 and 18, the table 1200 and a table 1800 contain the first information to be used to control the zoom magnification of the imaging unit when the camera apparatus 101 outputs an image having the first aspect (for example, 16:9). The tables 1200 and 1800 contain the second information to be used to control the zoom magnification of the imaging unit when the camera apparatus 101 outputs an image having the second aspect ratio (for example, 4:3).

As described above, the zoom magnification of the imaging unit corresponds to a field angle at which the imaging unit performs imaging. That is, the tables 1200 and 1800 contain information for controlling the field angle of the imaging unit when the camera apparatus 101 outputs an image having the first aspect ratio. The tables 1200 and 1800 also contain information for controlling the field angle of the imaging unit when the camera apparatus 101 outputs an image having the second aspect ratio.

Assume that in this embodiment, a captured image having the second aspect ratio is smaller at the ratio of the length in one of the vertical and horizontal directions to the length in the other direction than a captured image having the first aspect ratio.

Upon receiving, for example, a zoom operation request from the viewer apparatus 130, the communication unit 111 transmits the zoom operation request to the camera control unit 107 and waits for a lens operation completion notification (steps S702, S703, and S704). Upon receiving the zoom operation request from the communication unit 111 (steps S801 and S804), the camera control unit 107 decides a zoom magnification from the instructed field angle and the table 1200 (step S805). This embodiment will exemplify the case of using a field angle to instruct the range of a region (imaging range) depicted in the captured image output from the camera apparatus 101. The user may instruct an imaging range. Alternatively, as described later, an imaging range may be set by a field angle in advance for each imaging direction (preset position) of the imaging unit.

The field angles written on the tables to be described later with reference to FIGS. 12 and 18 represent the ranges of regions (imaging ranges) in the horizontal direction which should be depicted in the captured images output from the camera apparatus 101.

In addition, the magnifications written on the tables 1200 and 1800 to be described later with reference to FIGS. 12 and 18 indicate zoom magnifications when the imaging unit obtains captured images to output captured images in instructed imaging ranges. As described above, the zoom magnification of the imaging unit corresponds to a field angle at which the imaging unit performs imaging. That is, the magnifications indicated on the tables shown in FIGS. 12 and 18 indicate field angles at which the imaging unit performs imaging. This embodiment will exemplify the case in which zoom magnifications represent ranges in which the imaging unit performs imaging. It is, however, possible to designate ranges in which the imaging unit performs imaging by using field angles instead of zoom magnifications. For example, it is possible to write the field angles of the imaging unit in the fields of the tables 1200 and 1800 in place of the zoom magnifications.

Figure 7:
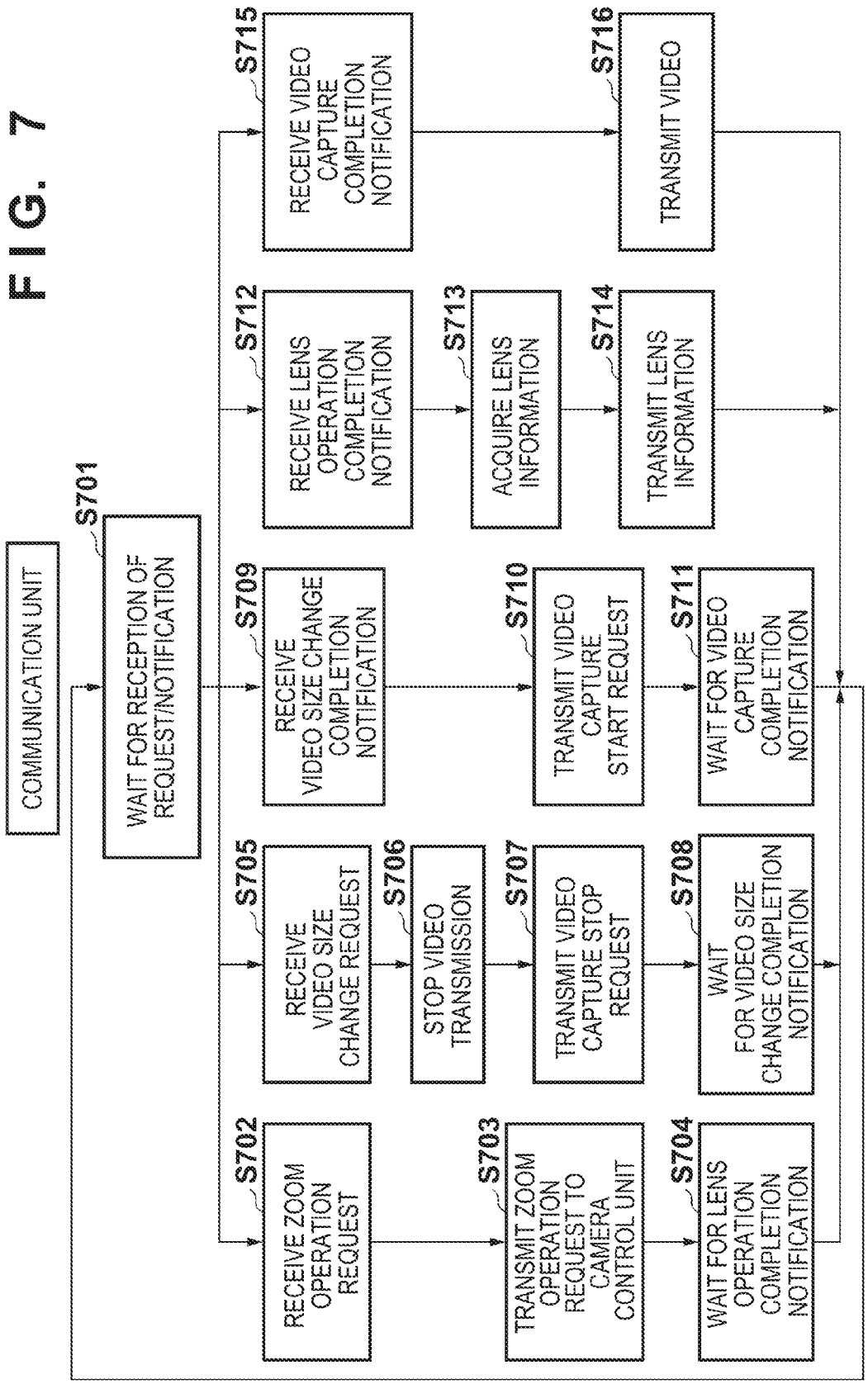
FIG. 7 is a flowchart showing control by a communication unit in the first embodiment.

Referring back to the flowchart of FIG. 7, the camera control unit 107 controls the lens unit by transmitting a lens operation request to the lens control unit 108 to set the decided zoom magnification (step S806), and waits for a lens operation completion notification from the lens control unit 108 (step S809). Upon receiving the notification of the completion of the lens operation of the lens unit (steps S801 and S807), the camera control unit 107 transmits the lens operation completion notification to the communication unit 111 (step S808).

Upon receiving the lens operation completion notification (steps S701 and S712), the communication unit 111 acquires lens information from the camera control unit 107 (step S713), and transmits the information to the viewer apparatus 130 (step S714). In addition, the capture unit 104 acquires a video 201 captured by the image sensor 102 and generated by the generation unit 103. Upon receiving a video capture completion notification from the capture unit 104 (steps S701 and S715), the communication unit 111 transmits video data 202 acquired by the capture unit 104 and encoded by the encoding unit 106 to the viewer apparatus 130 (step S716).

At this time, the generation unit 103 receives a video request for a size of 1,920×1,080 pixels (steps S1001 and S1002), and reads out a video from the image sensor 102 (step S1003). Thereafter, the capture unit 104 writes a video having a size of 1,920×1,080 pixels in a buffer (step S1004), and transmits a video generation completion notification to the capture unit 104 (step S1016).

When the user of the viewer apparatus 130 switches, via the input unit 134, the aspect ratio of a video from a 16:9 video having 1,920×1,080 pixels to a 4:3 video having 1,280×960 pixels, a video size change request is notified to the setting unit 109. Upon receiving the video size change request from 1,920×1,080 to 1,280×960 (steps S601 and S602), the setting unit 109 transmits a request to change the video size setting to the communication unit 111 (step S603). Upon receiving the video size change request (steps S701 and S705), the communication unit 111 temporarily stops video transmission to the viewer apparatus 130 (step S706), and transmits a video capture stop request to the capture unit 104 (step S707). Upon stopping the video transmission, the communication unit 111 waits for the completion of the video size change (step S708). Upon receiving the video capture stop request (steps S901 and S902), the capture unit 104 stops video capturing (step S903), and waits for a next processing request (step S901).

The setting unit 109 then transmits the video size change request to the camera control unit 107 and the capture unit 104 (steps S604 and S605). Upon receiving the video size change request (steps S801 and S802), the camera control unit 107 changes the table to be referred to in accordance with the requested video size. That is, the camera control unit 107 changes the table to be referred to from the table 1201 for a 16:9 having a size of 1,920×1,080 pixels to a 4:3 video table 1202 used for a 4:3 video having a size of 1,280×960 pixels in FIG. 12 (step S803).

Upon receiving the video size change request (steps S901 and S909), the capture unit 104 transmits the video size change request to the generation unit 103 (step S910). Upon receiving the video size change request (steps S1001 and S1014), the generation unit 103 changes the size of a video to be generated when the video request is received (step S1015).

Figure 11:
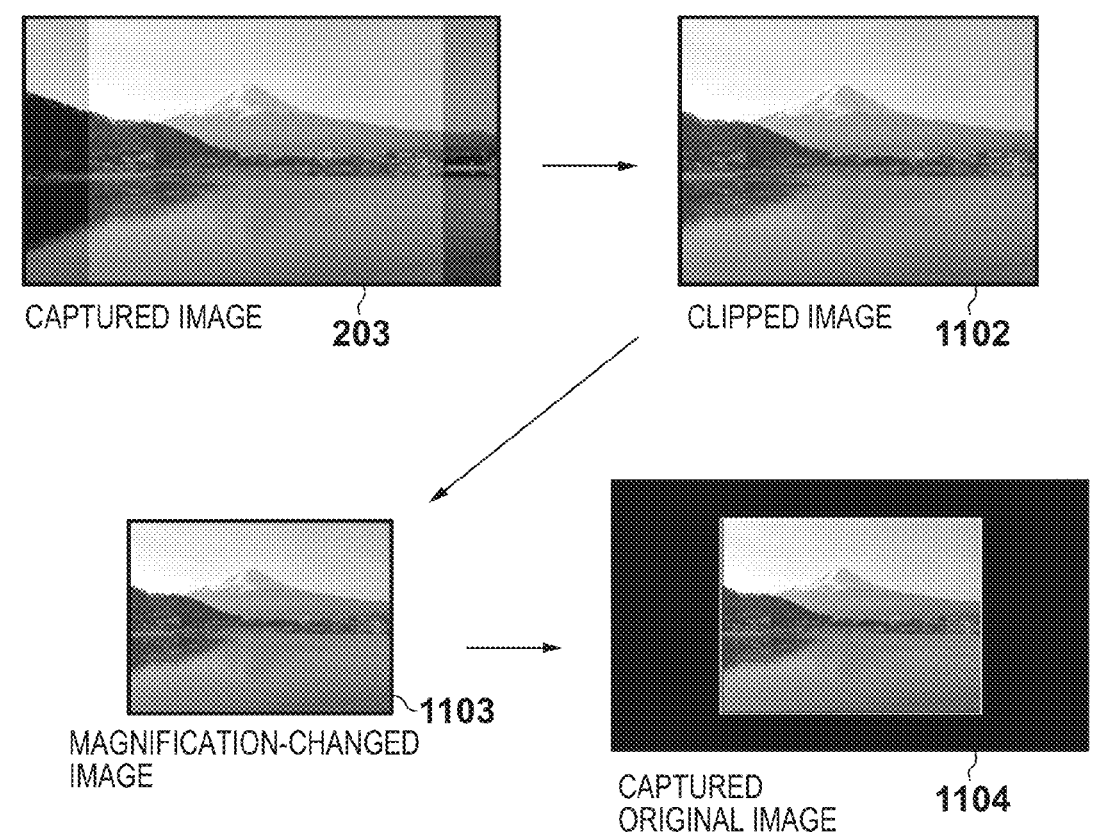
FIG. 11 is a view showing a video generation method in the first embodiment.

The processing of generating a 4:3 video having a size of 1,280×960 pixels by the generation unit 103 will be described below with reference to FIG. 11. Upon receiving a request for a 4:3 video having a size of 1,280×960 pixels (step S1009), the generation unit 103 performs 4:3 video generation processing. First of all, the generation unit 103 acquires a video 203 having a size of 1,920×1,080 pixels from the image sensor 102 (step S1010). The generation unit 103 then clips a region 1102 having 1,440×1,080 pixels so as to set the aspect ratio of the video to 4:3 (step S1011). The generation unit 103 then changes the magnification of the video of the region 1102 to a video 1103 having a size of 1,280×960 pixels by using the magnification changing unit 105 (step S1012). The generation unit 103 writes, in a buffer, a video (captured original image 1104) obtained by superimposing the image having a size of 1,280×960 pixels, which has undergone the above magnification changing operation, on a central portion of a black image of a size of 1,920×1,080 pixels (step S1013). The generation unit 103 then transmits a video generation completion notification to the capture unit 104 (step S1016).

Upon transmitting the video size change request, the setting unit 109 then determines whether preset setting has been performed (step S606). If preset setting has not been performed, the setting unit 109 transmits a video size change completion notification to the communication unit 111 (step S613). Upon receiving the video size change completion notification (steps S701 and S709), the communication unit 111 transmits a video capture start request to the capture unit 104 (step S710). The communication unit 111 then waits for a video capture completion notification (step S711). Thereafter, upon receiving the video capture completion notification (steps S701 and S715), the communication unit 111 encodes the captured original image 1104 by using the encoding unit 106, and transmits the resultant data to the viewer apparatus 130 (step S716).

Figure 3:
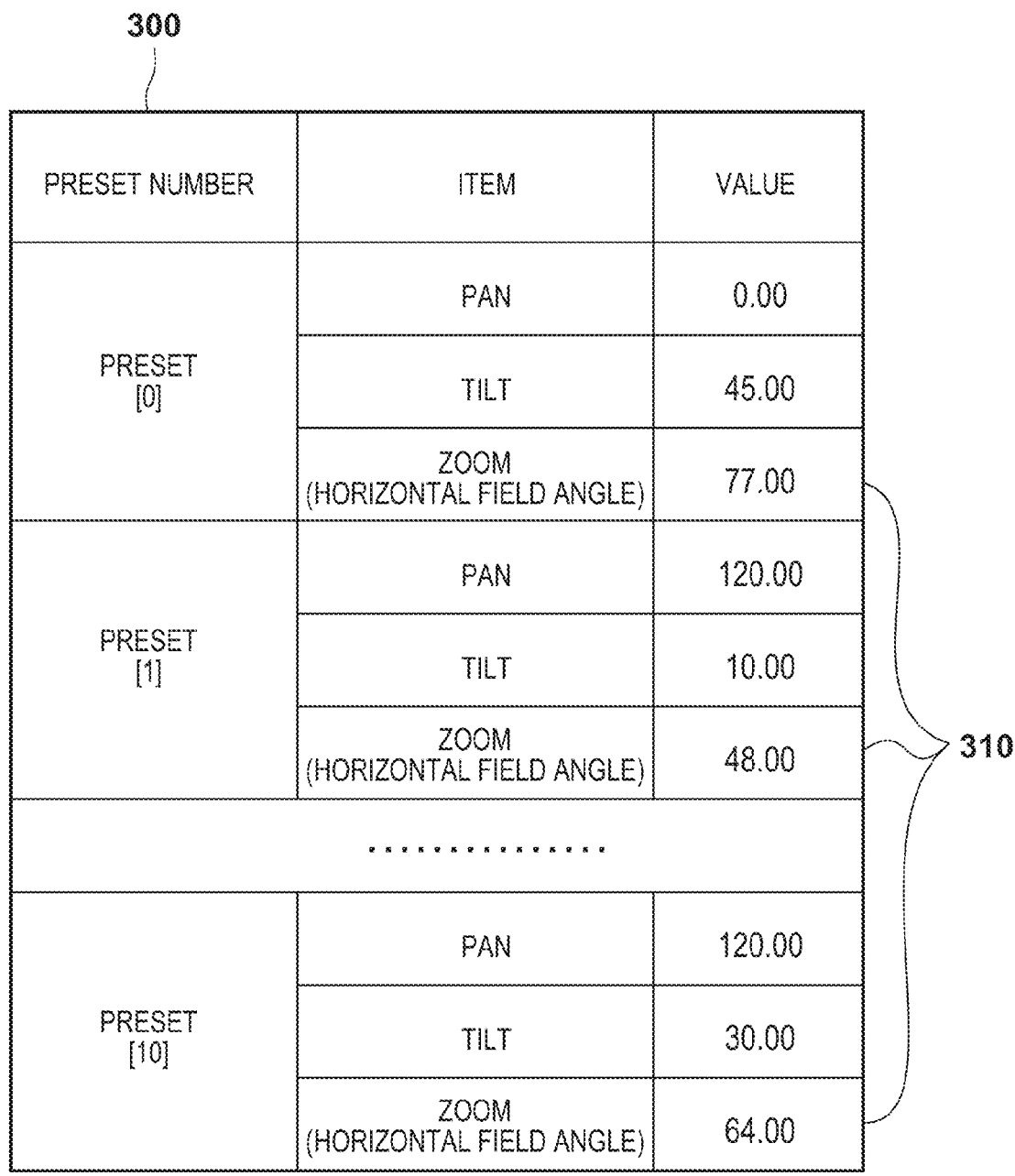
FIG. 3 is a view showing preset set values in this embodiment.

On the other hand, upon determining, in preset determination (step S606), that preset setting has been performed, the setting unit 109 acquires preset set information 300 (step S607). The user designates preset settings by using a preset number like that shown in FIG. 3 via the viewer apparatus 130. If, for example, the user designates preset number "0", the camera platform control unit 110 controls to set the imaging direction of the camera to the first imaging direction (a pan angle of 0° and tilt angle of 45°). In addition, the lens control unit 108 instructs a zoom value designated by a horizontal field angle (77°). This horizontal field angle designates the first imaging range of the captured image output from the camera apparatus 101 when the imaging direction of the imaging unit is the first imaging direction.

Likewise, if the user designates preset number "1", the camera platform control unit 110 controls to set the imaging direction of the camera to the second imaging direction (a pan angle of 120° and tilt angle of 10°). In addition, the lens control unit 108 instructs a zoom value designated by a horizontal field angle (48°). This horizontal field angle designates the second imaging range of the captured image output from the camera apparatus 101 when the imaging direction of the imaging unit is the second imaging direction.

Upon acquiring horizontal field angle information 310 from the preset set information 300 (step S608), the setting unit 109 transmits a zoom operation request for a designated field angle to the camera control unit 107 to control the lens unit to set the obtained horizontal field angle (step S609). Thereafter, the setting unit 109 shifts to wait for the completion of the lens operation by the lens control unit 108 (step S610).

Upon receiving a zoom operation request (steps S801 and S804), the camera control unit 107 decides a zoom magnification from the table 1200 and the received horizontal field angle information 310 (step S805). The table 1200 used by the camera control unit 107 at this time is the 4:3 video table 1202. Upon deciding a zoom magnification, the camera control unit 107 transmits a lens operation request to the lens control unit 108 (step S806), and waits for a lens operation completion notification (step S809). The table 1200 records the correspondence between field angles and zoom magnifications for each aspect ratio. When performing imaging with an aspect ratio of 16:9, therefore, the camera control unit 107 decides the zoom magnification of the zoom mechanism so as to maintain the field angle currently set in the zoom mechanism in a video having an aspect ratio of 4:3.

Assume that the horizontal field angle designated by the preset set information 300 is 48°. In this case, if a 16:9 video has been captured, the zoom magnification is 160 from a 16:9 video table 1201. According to the 4:3 video table 1202, if the horizontal field angle is 48°, the zoom magnification is 119. If, therefore, a 16:9 video is switched to a 4:3 video and preset designation has been performed, the camera control unit 107 performs lens unit control for the lens control unit 108 to set a horizontal field angle of 48° by using the decided zoom magnification of 119.

Upon completion of lens unit control, the lens control unit 108 notifies the camera control unit 107 of the completion of the lens operation. Upon receiving a lens operation completion notification indicating the completion of the lens unit operation from the lens control unit 108 (step S807), the camera control unit 107 notifies the setting unit 109 of the completion of the lens operation (step S808). Upon receiving the lens operation completion notification from the lens control unit 108 (step S611), the setting unit 109 transmits the video size change completion notification to the communication unit 111 (step S612).

Upon receiving the video size change completion notification (step S709), the communication unit 111 transmits a video capture start request to the capture unit 104 (step S710). Upon receiving the video capture start request (step S904), the capture unit 104 starts video capture processing (step S905).

The generation unit 103 generates a video having an aspect ratio of 4:3 and 1,280×960 pixels by clipping a video having an effective region of 1,280×960 pixels generated by the above procedure (steps S1010 and S1011). The generation unit 103 then changes the magnification of the clipped video to a video size of 1,280×960 pixels by using the magnification changing unit 105 (step S1012). The generation unit 103 writes, in the buffer, the captured original image 1104 obtained by superimposing the image having a size of 1,280×960 pixels, which has undergone the above magnification changing operation, on a central portion of a black image of a size of 1,920×1,080 pixels (step S1013). The generation unit 103 then transmits a video generation completion notification to the capture unit 104 (step S1016).

Figure 2:
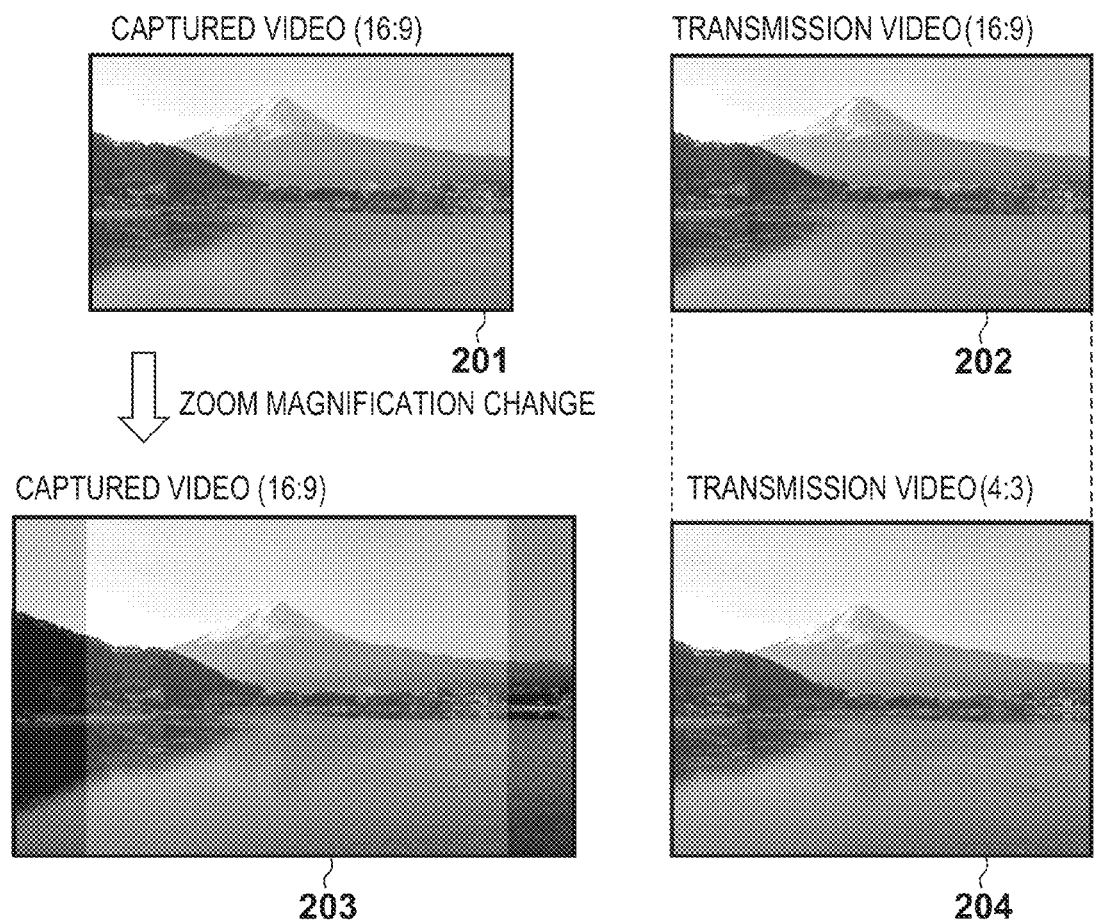
FIG. 2 is a view for explaining preset control in this embodiment.

Assume that the video 201 in FIG. 2 has been acquired while an aspect ratio of 16:9 is instructed. For example, a horizontal field angle of 48° is designated in the above manner, and the video 201 is the one obtained with a zoom magnification of 160. When the aspect ratio is changed to 4:3, the zoom magnification is changed to 119. The video 203 having a size of 1,920×1,080 pixels is acquired. Clipping a size of 1,440×1,080 pixels from the video 203 will obtain a video having an aspect ratio of 4:3. The magnification changing unit 105 obtains a video 204 by changing the magnification of the video to a size of 1,280×960 pixels. With the above processing, the image range of the video to be transmitted is maintained even if the aspect ratio is changed.

This embodiment has exemplified the case of maintaining an imaging range in the horizontal direction in a captured image to be output even if the aspect ratio is changed. However, it is also possible to maintain the imaging range in the vertical direction in a captured image to be output even if the aspect ratio is changed.

In this manner, if the first aspect ratio (for example, 16:9) is instructed, the camera apparatus 101 outputs the first captured image having the first aspect ratio. In addition, if the second aspect ratio (for example, 4:3) is instructed, the camera apparatus 101 clips the third captured image having the second aspect ratio from the second captured image obtained by the imaging unit. In this case, the third captured image is an image which corresponds to the first captured image in the imaging range in one of the vertical and horizontal directions and is smaller at the ratio of the length in one direction to the length in the other direction than the first captured image.

Upon receiving the video generation completion notification (step S906), the capture unit 104 performs capture processing for the video (step S907) and transmits a video capture completion notification to the communication unit 111 (step S908). Upon receiving the video capture completion notification from the capture unit 104 (step S715), the communication unit 111 transmits the received video to the viewer apparatus 130 (step S716).

Note that an aspect ratio of 16:9 is maintained in changing the video size, the magnification changing unit 105 changes the magnification of the video acquired by the generation unit 103. Upon receiving a video size request (step S1005), the generation unit 103 acquires a video having a size of 1,920× 1,080 pixels from the image sensor 102 (step S1006), and changes the magnification of the video to a size of 1,280×720 pixels by using the magnification changing unit 105 (step S1007). The generation unit 103 writes, in the buffer, the captured original image 1104 obtained by superimposing the image having a size of 1,280×720 pixels, which has undergone the above magnification changing operation, on a central portion of a black image of a size of 1,920×1,080 pixels (step S1008). The generation unit 103 then transmits a video generation completion notification to the capture unit 104 (step S1016).

Second Embodiment

The following will describe switching from a 16:9 video to a 4:3 video when switching between aspect ratios in the second embodiment of the present invention with reference to the accompanying drawings.

In the first embodiment, when capturing a 4:3 video having a size of 1,280×960 pixels, the generation unit 103 acquires a video having an aspect ratio of 4:3 by cutting off two ends of the video (clipped region 1102). When the generation unit 103 cuts off the two ends of the video, if, for example, the horizontal field angle set by presetting is at wide end of a 16:9 video, the zoom magnification exceeds the limit of the zoom mechanism. That is, the field angle (zoom magnification) at which the imaging unit should perform imaging to generate a captured image with an imaging range maintained in the horizontal direction exceeds the field angle (zoom magnification) at which the imaging unit can perform imaging. For this reason, it is not possible to acquire a video having a size of 4:3 at the designated horizontal field angle.

For example, according to the table 1200 in the first embodiment, the maximum field angle in the 4:3 video table 1202 is 57°, and the maximum field angle in the 16:9 video table 1201 is 77°. If, therefore, a field angle larger than 57° is designated for a 16:9 video, it is not possible to obtain a desired 4:3 video. The second embodiment will exemplify a case in which the field angle of a 16:9 video exceeds the maximum field angle of a 4:3 video.

FIG. 18 is a view showing an example of the data arrangement of a table 1800 used in the second embodiment. In this embodiment, the table 1800 includes a 16:9 table 1801 and a 4:3 table 1803. Pieces of video size information 1802 and 1804 respectively represent the number (Hline) of black pixels in the horizontal direction and the number (Vline) of black pixels in the vertical direction which should be added to a video in accordance with an instructed field angle.

Figure 13:
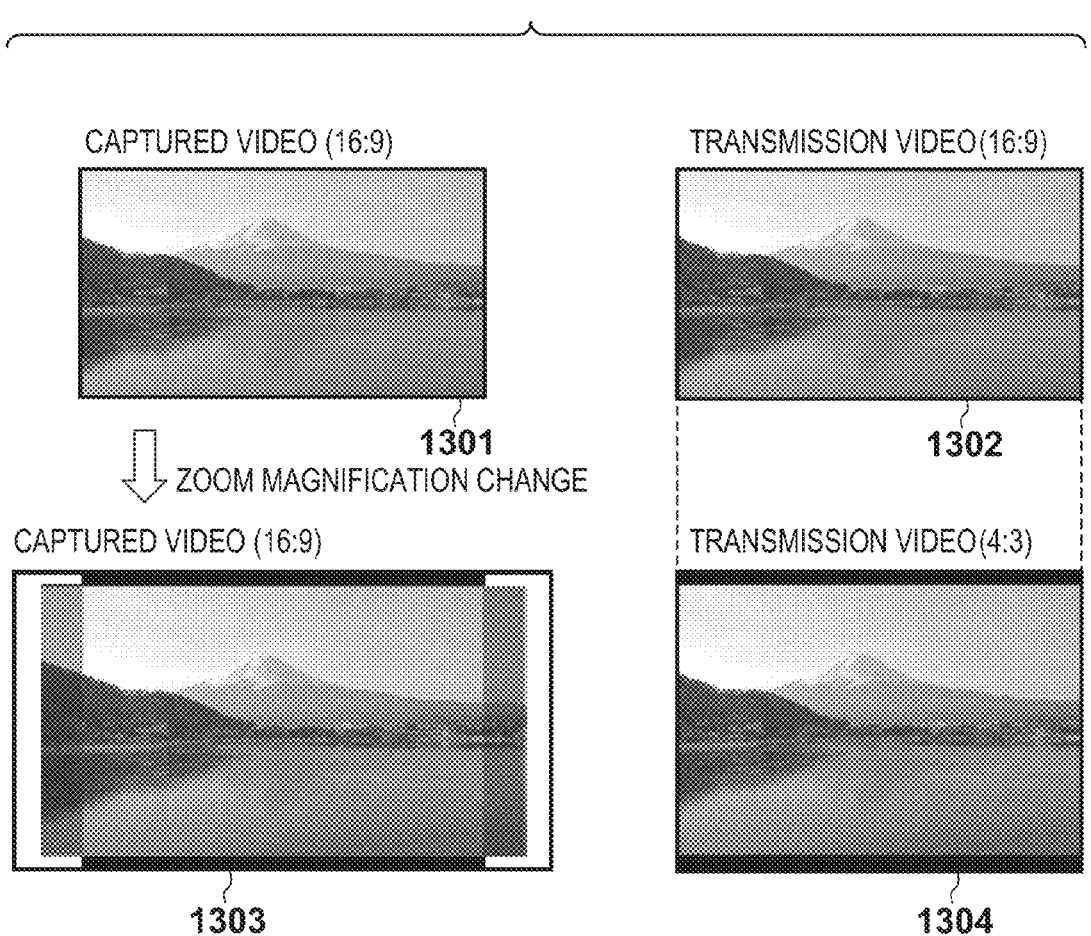
FIG. 13 is a view showing preset control in the second embodiment.

FIG. 13 is a view for explaining an example of processing to be performed when it is not possible to maintain the field angle because of a change in zoom magnification when changing the aspect ratio. If the maximum field angle of a 16:9 video (captured video 1301) exceeds that of a 4:3 video, the zoom magnification is changed based on the table 1800 (1303). The apparatus clips a 4:3 video so as to achieve the designated field angle. At this time, the apparatus performs the processing of interpolating a lack of pixels in the vertical direction with a black image (1303). This makes it possible to transmit videos with the same horizontal field angle both when transmitting a 16:9 video (transmission video 1302) and when transmitting a 4:3 video (transmission video 1304). A processing procedure in the second embodiment will be described below.

Figure 6:
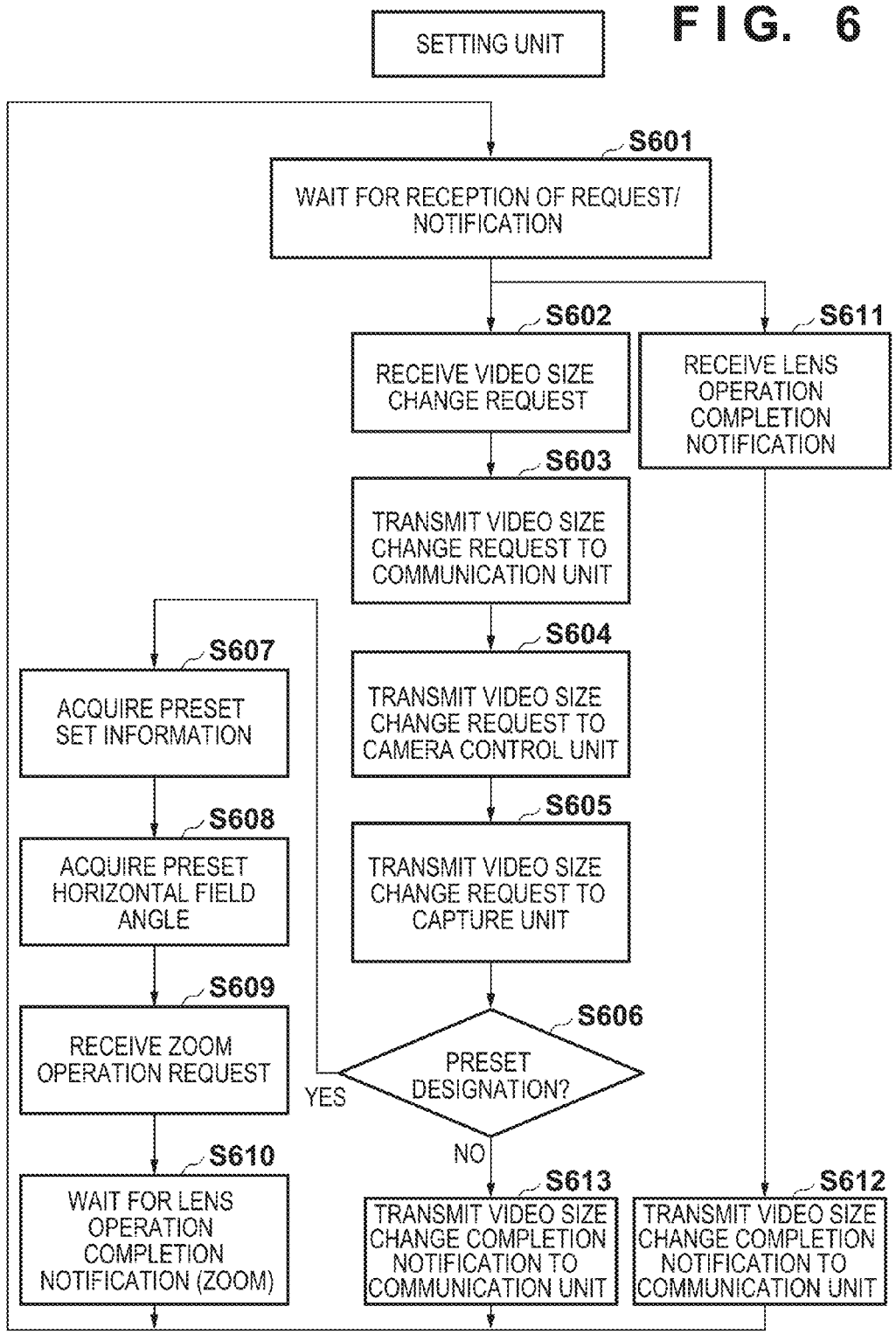
FIG. 6 is a flowchart showing control by a setting unit in the first embodiment.
Figure 14:
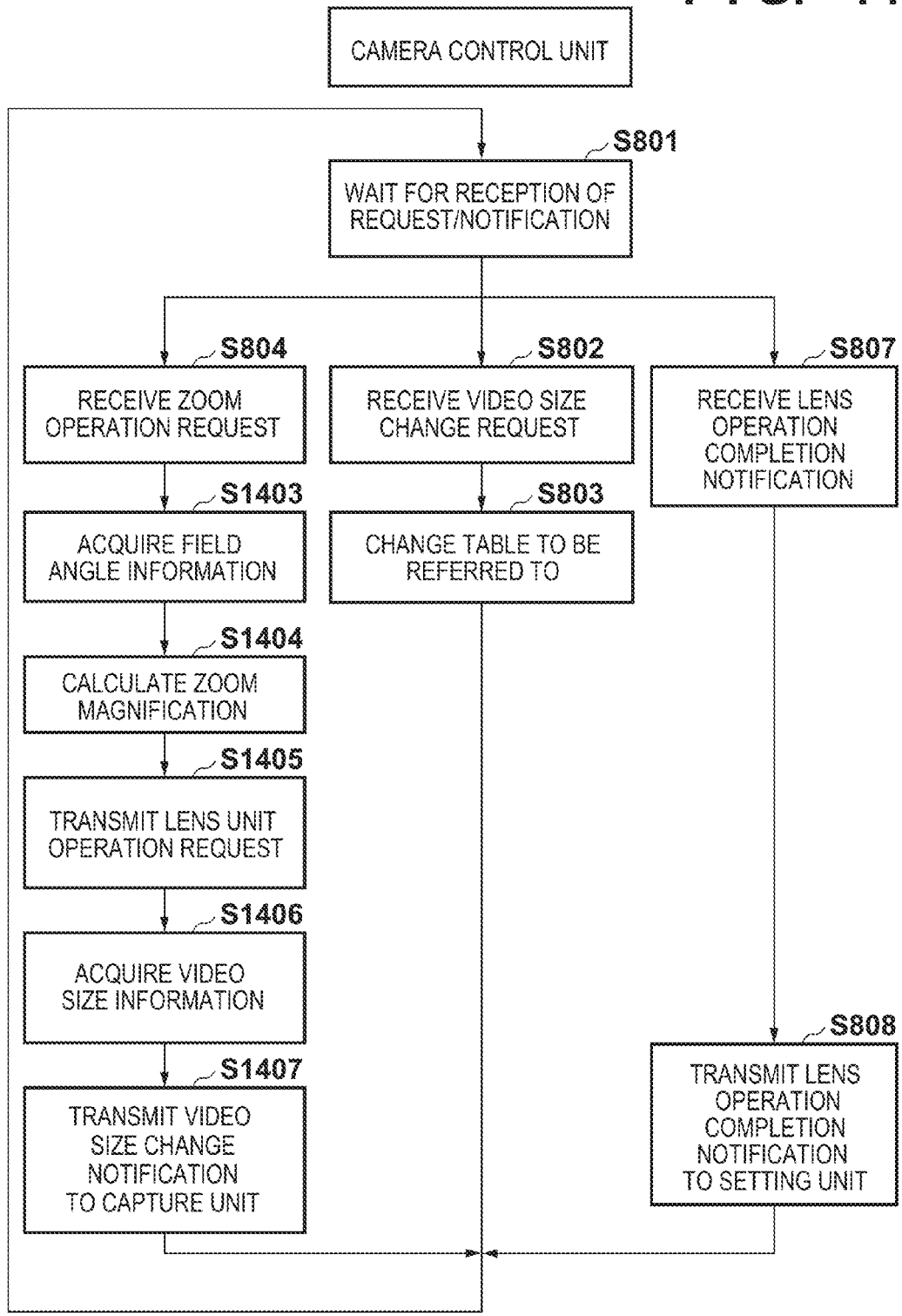
FIG. 14 is a flowchart showing control by a camera control unit in the second embodiment.
Figure 15:
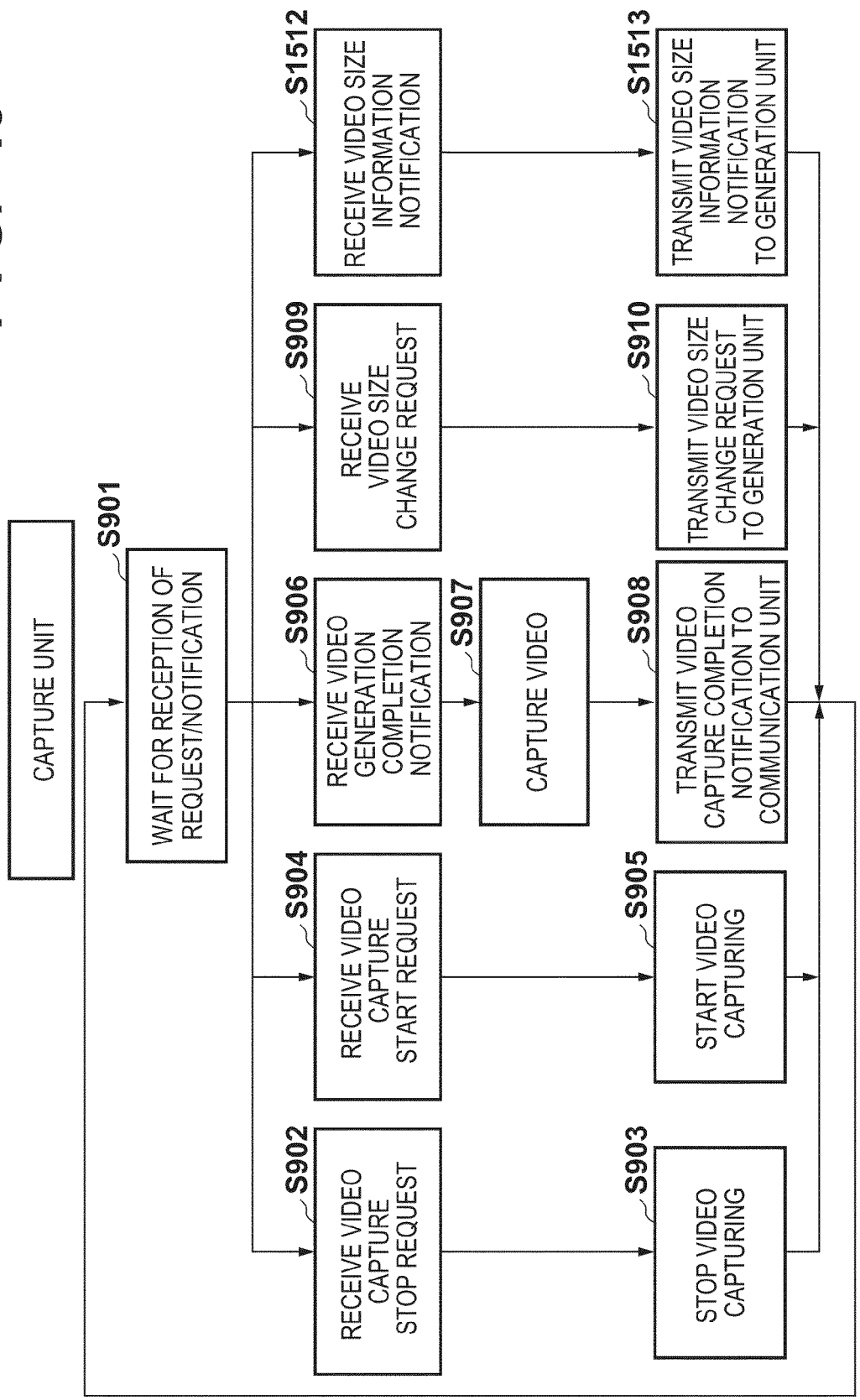
FIG. 15 is a flowchart showing control by a capture unit in the second embodiment.
Figure 16:
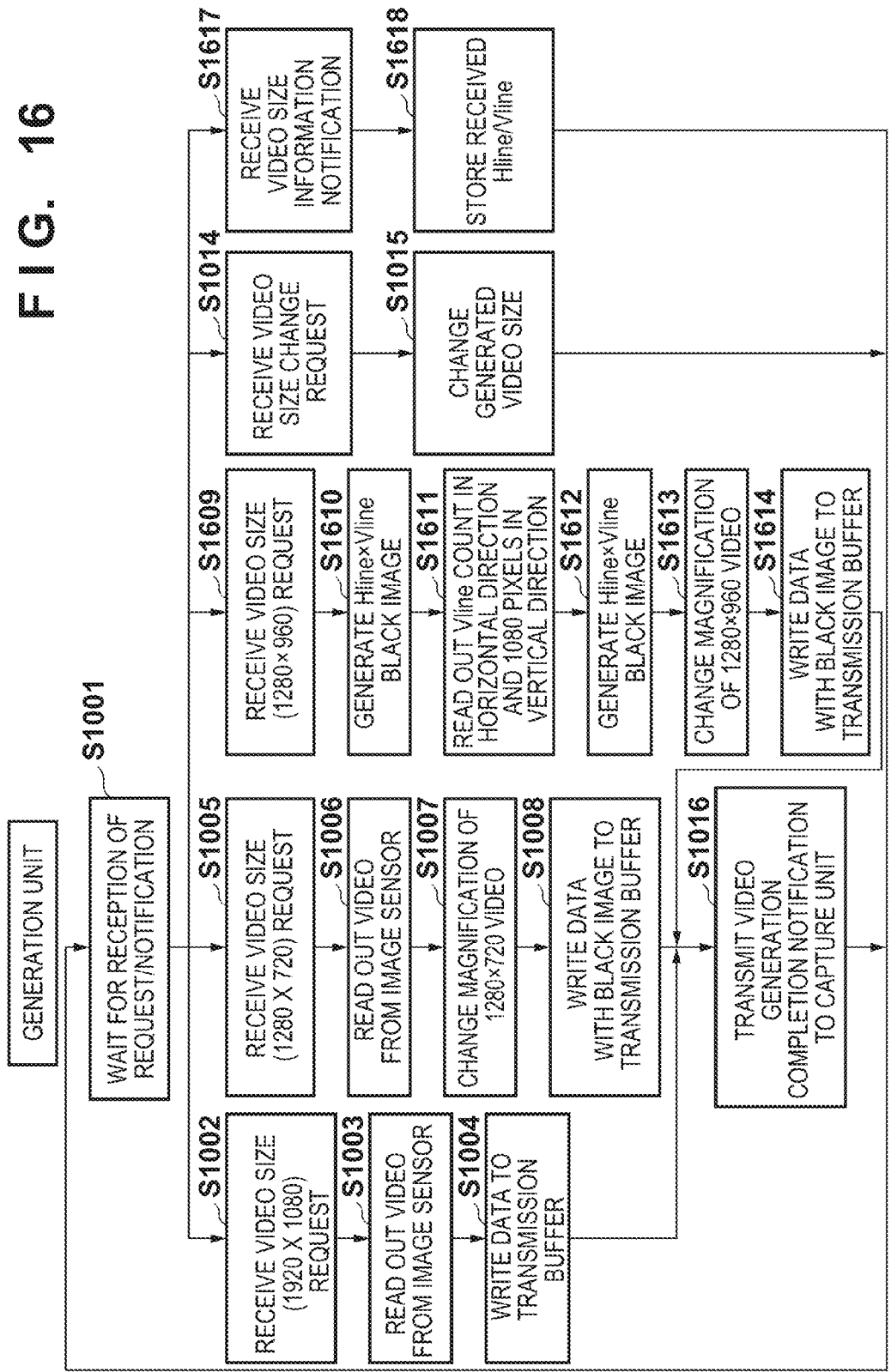
FIG. 16 is a flowchart showing control by a generation unit in the second embodiment.

The operations of a setting unit 109 and a communication unit 111 are the same as those in the first embodiment (FIGS. 6 and 7). The flowcharts of FIGS. 14, 15, and 16 show the operations of a camera control unit 107, a capture unit 104, and a generation unit 103. The same step numbers as in the first embodiment indicate the same processes in the second embodiment.

Upon receiving a zoom operation request for a designated field angle (step S804), the camera control unit 107 acquires field angle information by referring to the 4:3 video table 1803 based on the table 1800 and the received horizontal field angle information (step S1403), and decides a zoom magnification (step S1404). The camera control unit 107 then transmits a lens operation request for the designated field angle to the lens control unit 108 (step S1405). Subsequently, the camera control unit 107 acquires the video size information 1804 of the corresponding field angle (step S1406), and notifies the capture unit 104 of the obtained video size information (video size information notification) (step S1407).

Upon receiving the video size information 1804 via the video size information notification (step S1512), the capture unit 104 notifies the generation unit 103 of the received video size information 1804 (step S1513). Upon receiving the video size information 1804 (steps S1001 and S1617), the generation unit 103 stores the obtained video size information in a memory as reference information at the time of video generation (step S1618).

Figure 17:
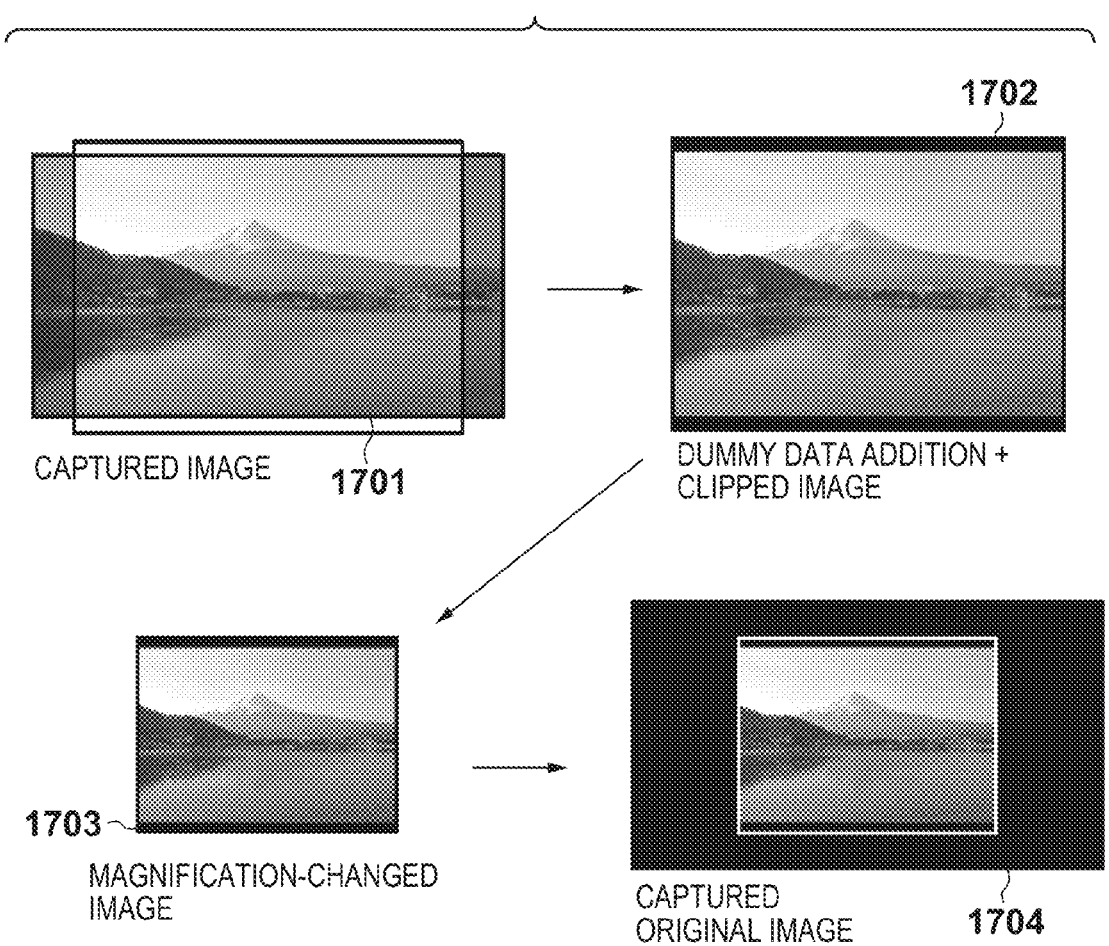
FIG. 17 is a view showing a video generation method in the second embodiment.

A processing procedure for generating a 4:3 video by the generation unit 103 using the video size information 1804 will be described next with reference to FIG. 17. The video size information 1804 includes information which is constituted by two values, namely Hline and Vline, and concerns interpolation of a black image when generating a video. If Hline is 0, it is not necessary to perform interpolation using a black image. If Hline is a value other than 0, it represents the number of pixels in the horizontal direction when generating a 4:3 video, and Vline represents the number of pixels in the vertical direction when performing interpolation in the vertical direction.

Upon receiving a request for a 4:3 video size corresponding to a size of 1,280×960 pixels (step S1609), the generation unit 103 acquires a video 1701 having a size of 1,920×1,080 pixels from the image sensor 102 and generates a black image for interpolation in the vertical direction (step S1610). The size of the black image to be generated at this time corresponds to Hline in the horizontal direction and Vline in the vertical direction which are acquired in advance from the video size information 1804 of the table 1800. The generation unit 103 then clips, from the video 1701, a region including the number of pixels represented by Hline in the horizontal direction and 1,080 pixels in the vertical direction, which are obtained from the video size information 1804 (step S1611). The generation unit 103 then generates a black image having the number of pixels acquired from the video size information 1804 again (step S1612), and adds the image to the clipped region, thereby generating a video 1702 having a size of 4:3. The generation unit 103 then changes the magnification of the video 1702 to a video 1703 having a size of 1,280×960 pixels (step S1613) by using a magnification changing unit 105. Subsequently, the generation unit 103 writes, in a buffer, a video 1704 obtained by superimposing an image having a size of 1,280×960 pixels, which has undergone the magnification changing operation, on a central portion of the black image having a size of 1,920×1,080 pixels (step S1614), and transmits a video generation completion notification to the capture unit 104 (step S1016).

The following will describe in detail a case in which the horizontal field angle designated by the preset set information 300 is 64°.

Assume that the horizontal field angle is 64°. In this case, if a 16:9 video has been captured, a zoom magnification from the 16:9 video table 1801 is 120. However, according to the 4:3 video table 1803, the magnification is 100, and Hline and Vline of video size information respectively indicate 1,600 and 60. The camera control unit 107 therefore transmits an operation request with a magnification of 100 and a field angle of 64° with respect to the lens control unit 108 to the lens control unit 108.

On the other hand, upon receiving the video size information 1804, the generation unit 103 generates a black image having 1,600×60 pixels. Thereafter, the generation unit 103 acquires a video having 1,600×1,080 pixels from the image sensor, and generates a black image having 1,600×60 pixels. In this manner, the generation unit 103 generates an image having an aspect ratio of 4:3 and 1,600×1,200 pixels. Although the generation unit 103 generates black images with Hline×Vline in steps S1610 and S1612, the generation unit 103 may generate two black images with Hline×Vline in either of steps S1610 and S1612.

Processing after the completion of lens control and video size change processing are the same as those in the first embodiment. In addition, although the second embodiment uses a black image as an image for interpolation, it is possible to use a captured video (for example, the average luminance of a video) or a gray or white image in accordance with a user instruction.

As described above, according to the second embodiment, if a zoom magnification for maintaining the field angle before a change in aspect ratio exceeds the limit of the zoom mechanism, the zoom magnification is set to the limit (or may be set to a value equal to or less than the limit). A region corresponding to the field angle is clipped from the video obtained by an image sensor 102. Subsequently, adding a predetermined image (a black image in the above case) to the clipped region will generate a video corresponding to the aspect ratio after the change while maintaining the field angle.

Other Embodiments

Although the first and second embodiments use a horizontal field angle as a preset setting, the present invention is not limited to this. For example, it is possible to easily use a vertical field angle as a preset setting. If, for example, the aspect ratio of the image sensor 102 is 4:3, it is especially effective to perform control by changing a zoom magnification using a vertical field angle.

In addition, although the above description has exemplified the case of 16:9 and 4:3 as aspect ratios, it is obvious that the present invention can also be applied to videos having other aspect ratios. In addition, although an image transmitted to the viewer apparatus 130 is the captured original image 1104 shown in FIG. 11, the apparatus may be configured to transmit a 16:9 or 4:3 video without any change.

As described above, according to each embodiment described above, in the monitoring camera capable of outputting a video having the first aspect ratio and a video having the second aspect ratio upon switching between them, even if the aspect ratio is changed, the field angle is maintained. For example, even if the apparatus switches between a video having an aspect ratio of 16:9 and a video having an aspect ratio of 4:3, it is possible to obtain a preset video having a desired field angle without resetting the preset settings set in advance.

Although each of the above embodiments has exemplified the case in which when a field angle has been set by preset setting, the apparatus operates so as to maintain the field angle, the present invention is not limited to this. For example, the apparatus may be provided with a field angle maintaining mode. When an aspect ratio is changed in this mode, the apparatus may maintain the field angle even with a change in aspect ratio by executing the above operation at the time of preset setting. In addition, although each of the above embodiments is configured to decide a zoom magnification (the field angle of the imaging unit) by using a table, the apparatus may be configured to decide a zoom magnification by other methods, for example, calculating a zoom magnification required to output a captured image within a desired imaging range.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-113169, filed May 29, 2013, which is hereby incorporated by reference herein in its entirety.

What is claimed is:

1. An output apparatus comprising:
a control unit configured to perform control to make an imaging unit obtain a first captured image; and
an output unit configured to output the first captured image, wherein, in case where a captured image to be output from the output unit is changed from the first captured image to a captured image which is smaller at a ratio of a length in one of a vertical direction and a horizontal direction to a length in the other direction than the first captured image, the control unit controls to make the imaging unit obtain a second captured image by setting a field angle of the imaging unit to a field angle larger than a field angle at which the first captured image is obtained, and
the output unit outputs a third captured image, upon clipping the image from the second captured image, which is smaller at a ratio of a length in the one direction to a length in the other direction than the first captured image, with an imaging range in the one direction corresponding to the first captured image.

2. The apparatus according to claim 1, wherein said output unit outputs an image obtained by adding a predetermined image to a captured image corresponding to the first captured image when the imaging unit obtains the first captured image at a predetermined field angle and said output unit outputs an image smaller at the ratio of the length in the one direction to the length in the other direction than the first captured image, with the imaging range in the one direction corresponding to the first captured image.

3. The apparatus according to claim 1, further comprising an acquisition unit configured to acquire a designation of a region to be imaged by the imaging unit and a field angle at which the imaging unit images a designated region,
wherein said output unit outputs an image obtained by adding a predetermined image to a captured image corresponding to the first captured image when a field angle acquired by said acquisition unit is larger than a predetermined field angle and said output unit outputs an image smaller at the ratio of the length in the one direction to the length in the other direction than the first captured image, with the imaging range in the one direction corresponding to the first captured image.

4. The apparatus according to claim 1, further comprising a holding unit configured to hold information representing a zoom magnification at which the imaging unit performs imaging when outputting a captured image, with an imaging range in the one direction is a first range, at a first aspect ratio, and a zoom magnification at which the imaging unit performs imaging when outputting a captured image, with an imaging range in the one direction corresponding to a range corresponding to the first range, at a second aspect ratio,
wherein said control unit controls a zoom magnification at which the imaging unit performs imaging, based on the information held in said holding unit.

5. The apparatus according to claim 1, wherein said output unit outputs a captured image obtained by changing a magnification of a captured image clipped from the second captured image as the third captured image when outputting the third captured image.

6. The apparatus according to claim 1, further comprising:
an acquisition unit configured to acquire third information representing an imaging range of the imaging unit in one of a vertical direction and a horizontal direction; and
a generation unit configured to generate the third captured image,
wherein said output unit restricts a captured image obtained by the imaging unit from being output until said generation unit generates the third captured image after said acquisition unit acquires the third information.

7. The apparatus according to claim 1, wherein, when a captured image to be output by the output unit is changed from the first captured image to the third captured image, the control unit changes zoom magnification of the imaging unit and makes the imaging unit to capture the second captured image.

8. The apparatus according to claim 1, wherein an aspect ratio of the first captured image is 16:9, and an aspect ratio of the third captured image is 4:3.

9. An output apparatus which is configured to change a ratio of a length of a captured image to be output in one of a vertical direction and a horizontal direction to a length in the other direction, the apparatus comprising:

an acquisition unit configured to acquire first information representing a first imaging range of a captured image to be output when an imaging direction of an imaging unit is a first imaging direction and second information representing a second imaging range of a captured image to be output when an imaging direction of the imaging unit is a second imaging direction; and an output unit configured to output a first captured image obtained by imaging an imaging range, with an imaging range in the one direction corresponding to the first imaging range, when outputting a captured image having a first ratio as the length ratio larger than a second ratio based on a captured image obtained by the imaging unit at a first field angle in the first imaging direction, output a second captured image, with an imaging range in the one direction corresponding to the first imaging range, when outputting a captured image having the second ratio based on a captured image obtained by the imaging unit at a second field angle larger than the first field angle in the first imaging direction, output a third captured image obtained by imaging an imaging range, with an imaging range in the one direction corresponding to the second imaging range, when outputting a captured image having the first ratio based on a captured image obtained by the imaging unit at a third field angle in the second imaging direction, and output a fourth captured image, with an imaging range in the one direction corresponding to the second imaging range, when outputting a captured image having the second ratio based on a captured image obtained by the imaging unit at a fourth field angle larger than the third field angle in the second imaging direction.

10. The apparatus according to claim 9, wherein said output unit outputs an image obtained by adding a predetermined image to a captured image corresponding to the captured image having the first ratio when an imaging range represented by information acquired by said acquisition unit is larger than a predetermined imaging range and said output unit outputs the image having the second ratio, with the imaging range in the one direction corresponding to the captured image having the first ratio.

11. A method of controlling an output apparatus, the method comprising:

a first control step of causing an imaging unit to obtain a first captured image;

a first output step of outputting the first captured image;

a second control step of, in case where a captured image to be output is changed from the first captured image to a captured image which is smaller at a ratio of a length in the one of a vertical direction and a horizontal direction to a length in the other direction than the first captured image, causing the imaging unit to obtain a second captured image by setting a field angle of the imaging unit to a field angle larger than a field angle at which the first captured image is obtained; and a second output step of outputting a third captured image, upon clipping the image from the second captured image, which is smaller at a ratio of a length in the one direction to a length in the other direction than the first captured image, with an imaging range in the one direction corresponding to the first captured image.

12. The method according to claim 11, further comprising a third output step of outputting an image obtained by adding a predetermined image to a captured image corresponding to the first captured image when the imaging unit obtains the first captured image at a predetermined field angle, and an image smaller at the ratio of the length in the one direction to the length in the other direction than the first captured image is to be output, with the imaging range in the one direction corresponding to the first captured image.

13. The storage method according to claim 11, wherein, when a captured image to be output is changed from the first captured image to the third captured image, the second control step changes a zoom magnification of the imaging unit and makes the imaging unit to capture the second captured image.

14. The storage method according to claim 11, wherein an aspect ratio of the first captured image is 16:9, and an aspect ratio of the third captured image is 4:3.

15. A method of controlling an output apparatus which is configured to change a ratio of a length of a captured image to be output in one of a vertical direction and a horizontal direction to a length in the other direction, the method comprising:

a first acquisition step of acquiring first information representing a first imaging range of a captured image to be output when an imaging direction of an imaging unit is a first imaging direction;

a first output step of outputting a first captured image obtained by imaging an imaging range, with an imaging range in the one direction corresponding to the first imaging range, when outputting a captured image having a first ratio as the length ratio larger than a second ratio based on a captured image obtained by the imaging unit at a first field angle in the first imaging direction and outputting a second captured image, with an imaging range in the one direction corresponding to the first imaging range, when outputting a captured image having the second ratio based on a captured image obtained by the imaging unit at a second field angle larger than the first field angle in the first imaging direction;

a second acquisition step of acquiring second information representing a second imaging range of a captured image to be output when an imaging direction of the imaging unit is a second imaging direction; and a second output step of outputting a third captured image obtained by imaging an imaging range, with an imaging range in the one direction corresponding to the second imaging range, when outputting a captured image having the first ratio based on a captured image obtained by the imaging unit at a third field angle in the second imaging direction and outputting a fourth captured image, with an imaging range in the one direction corresponding to the second imaging range, when outputting a captured image having the second ratio based on a captured image obtained by the imaging unit at a fourth field angle larger than the third field angle in the second imaging direction.

16. The method according to claim 15, further comprising a third output step of outputting an image obtained by adding a predetermined image to a captured image corresponding to the captured image having the first ratio when the acquired imaging range is larger than a predetermined imaging range and the image having the second ratio is output, with the imaging range in the one direction corresponding to the captured image having the first ratio.

17. A non-transitory computer readable storage medium storing a program for causing a computer to execute a first control procedure for causing an imaging unit to obtain a first captured image, a first output procedure for outputting the first captured image, a second control procedure for, in case where a captured image to be output is changed from the first captured image to a captured image which is smaller at a ratio of a length in one of a vertical direction and a horizontal direction to a length in the other direction than the first captured image, causing the imaging unit to obtain a second captured image by setting a field angle of the imaging unit to a field angle larger than a field angle at which the first captured image is obtained, and a second output procedure for outputting a third captured image, upon clipping the image from the second captured image, which is smaller at a ratio of a length in the one direction to a length at the other direction than the first captured image, with an imaging range in the one direction corresponding to the first captured image.

18. The storage medium according to claim 17, wherein the program causes the computer to execute a third output procedure for outputting an image obtained by adding a predetermined image to a captured image corresponding to the first captured image when the imaging unit obtains the first captured image at a predetermined field angle, and an image smaller at the ratio of the length in the one direction to the length in the other direction than the first captured image is to be output, with the imaging range in the one direction corresponding to the first captured image.

19. The storage medium according to claim 17, wherein, when a captured image to be output is changed from the first captured image to the third captured image, the second control procedure changes zoom magnification of the imaging unit and makes the imaging unit to capture the second captured image.

20. The storage medium according to claim 17, wherein an aspect ratio of the first captured image is 16:9, and an aspect ratio of the third captured image is 4:3.

21. A non-transitory computer-readable storage medium storing a program for causing a computer which is configured to change a ratio of a length of a captured image to be output in one of a vertical direction and a horizontal direction to a length in the other direction to execute a first acquisition procedure for acquiring first information representing a first imaging range of a captured image to be output when an imaging direction of an imaging unit is a first imaging direction, a first output procedure for outputting a first captured image obtained by imaging an imaging range, with an imaging range in the one direction corresponding to the first imaging range, when outputting a captured image having a first ratio as the length ratio larger than a second ratio based on a captured image obtained by the imaging unit at a first field angle in the first imaging direction and outputting a second captured image, with an imaging range in the one direction corresponding to the first imaging range, when outputting a captured image having the second ratio based on a captured image obtained by the imaging unit at a second field angle larger than the first field angle in the first imaging direction, a second acquisition procedure for acquiring second information representing a second imaging range of a captured image to be output when an imaging direction of the imaging unit is a second imaging direction, and a second output procedure for outputting a third captured image obtained by imaging an imaging range, with an imaging range in the one direction corresponding to the second imaging range, when outputting a captured image having the first ratio based on a captured image obtained by the imaging unit at a third field angle in the second imaging direction and outputting a fourth captured image, with an imaging range in the one direction corresponding to the second imaging range, when outputting a captured image having the second ratio based on a captured image obtained by the imaging unit at a fourth field angle larger than the third field angle in the second imaging direction.

22. The storage medium according to claim 21, wherein the program causes the computer to execute a third output procedure for outputting an image obtained by adding a predetermined image to a captured image corresponding to the captured image having the first ratio when the acquired imaging range is larger than a predetermined imaging range and the image having the second ratio is output, with the imaging range in the one direction corresponding to the captured image having the first ratio.

* * * * *